R. R. DOWNIE.
TRACTION WHEEL.
APPLICATION FILED JUNE 11, 1921.

1,430,801.

Patented Oct. 3, 1922.
2 SHEETS—SHEET 1

WITNESSES
Howard D. Orr
Harry E. Seidel

BY

INVENTOR,
Robert R. Downie,
C. G. Siggers
ATTORNEY

R. R. DOWNIE.
TRACTION WHEEL.
APPLICATION FILED JUNE 11, 1921.
1,430,801.　　　　　　　　　　　　　　Patented Oct. 3, 1922.
2 SHEETS—SHEET 2.
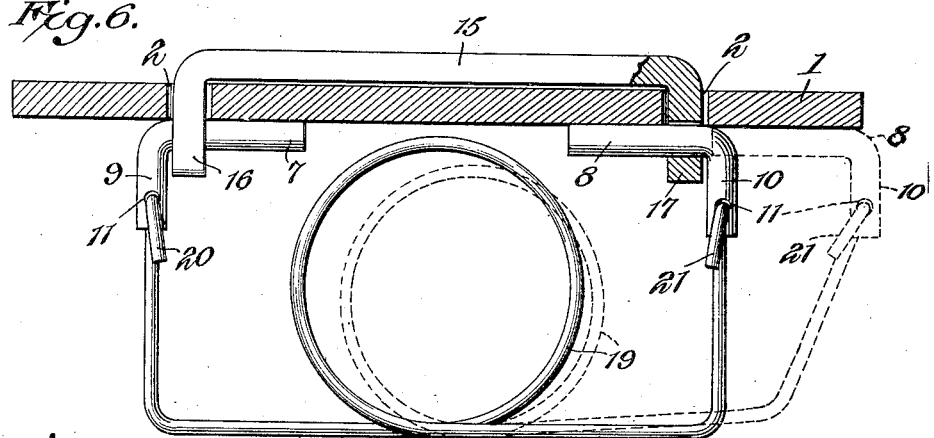
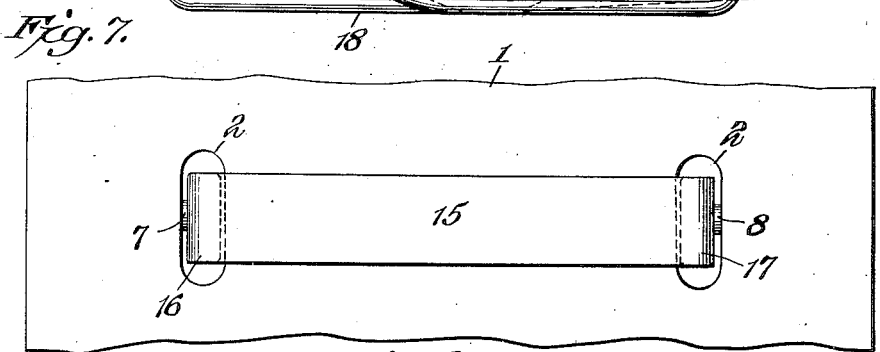
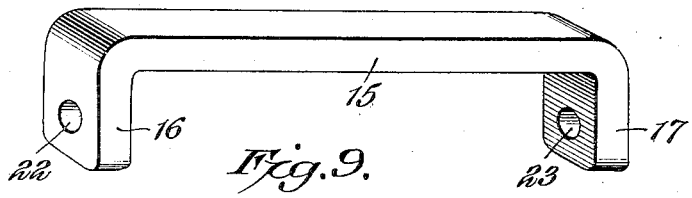
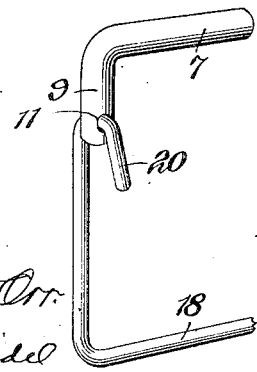
Robert R. Downie, INVENTOR,
WITNESSES
Howard D. Orr
Harry E. Seidel
BY
ATTORNEY Patented Oct. 3, 1922.

1,430,801

UNITED STATES PATENT OFFICE.

ROBERT REX DOWNIE, OF BEAVER FALLS, PENNSYLVANIA, ASSIGNOR TO KEYSTONE DRILLER COMPANY, A CORPORATION OF PENNSYLVANIA.

TRACTION WHEEL.

Application filed June 11, 1921. Serial No. 476,747.

*To all whom it may concern:*

Be it known that I, ROBERT REX DOWNIE, a citizen of the United States, residing at Beaver Falls, in the county of Beaver and State of Pennsylvania, have invented a new and useful Traction Wheel, of which the following is a specification.

This invention relates to improvements in traction wheels, and is more particularly directed to that class of wheels employed on power tractors or road vehicles of similar description to increase the traction power and prevent slippage.

An object of the invention is to provide a cleat of the utmost simplicity, which may be readily and quickly detached from the rim of a traction wheel without the use of tools, and which may be just as easily applied to the rim in such a manner that it will not weaken the same but will provide a maximum of traction under all conditions of service.

Another object of the invention is to provide a new and improved means for detachably locking each cleat independently to the rim of the wheel, and which locking means is located on the inside of the rim where it will be free from injury or distortion.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawings:—

Fig. 6 is a transverse section, showing a modification of the cleat and the locking means.

Fig. 7 is a plan view of the cleat shown in Fig. 6.

Fig. 8 is a view in perspective of the modified form of the cleat.

Fig. 9 is a fragmentary view in perspective of the modified form of detachable locking means.

Figure 1:
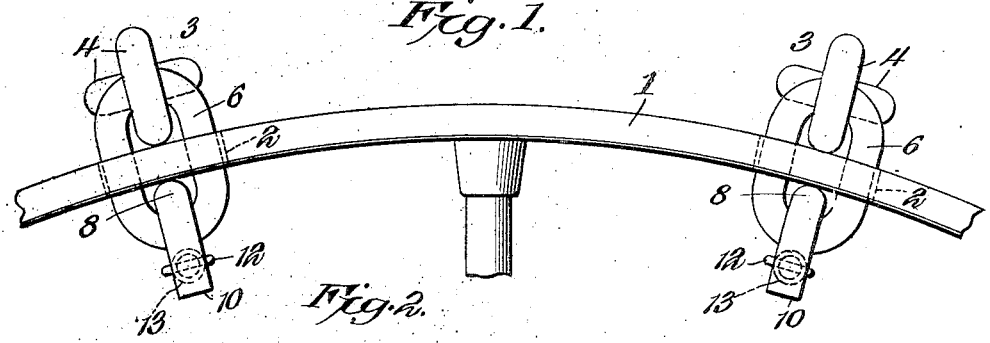
Fig. 1 is a fragmentary view in side elevation of a traction wheel, showing a plurality of cleats locked on the rim, the cleats being in the form of short chains.
Figure 2:
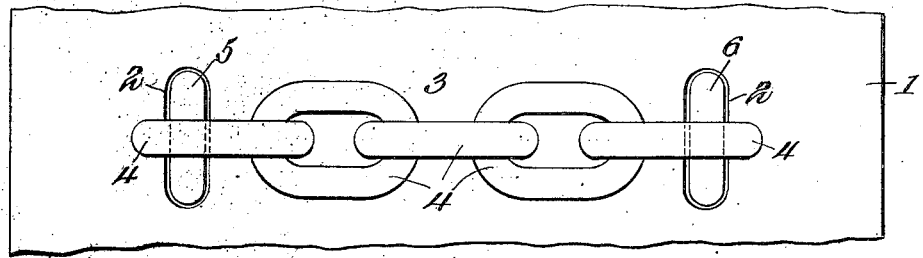
Fig. 2 is a plan view of the same, showing only one of the cleats.

Referring particularly to Figs. 1 to 5 of the drawings, 1 designates the rim of a traction wheel, provided with a plurality of spaced elongated transverse slots 2, which are located inwardly from the edges of the rim. A cleat 3, in this form, comprises a series of links 4 adapted to rest upon the outer surface of the rim 1, and end links 5 and 6, which are passed through the slots 2 and extending inwardly from the inside of the rim.

The number of links required to form a cleat for the various sizes of rims is only limited by the width of the rim and the size of the links employed. The end links 5 and 6 are secured at the inside of the rim 1 by a resilient detachable locking means, comprising slidable locking members 7 and 8 of right angular form, having arms 9 and 10, respectively, which are perforated at 11. Through the perforations 11 are inserted links 12 which are connected to a spring 13 by means of the eyes 14 formed at each end of the spring.

Figure 3:
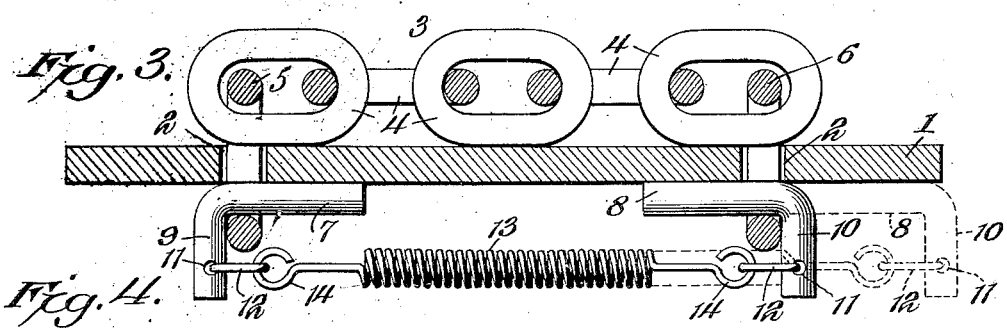
Fig. 3 is a transverse section of the same.
Figure 4:
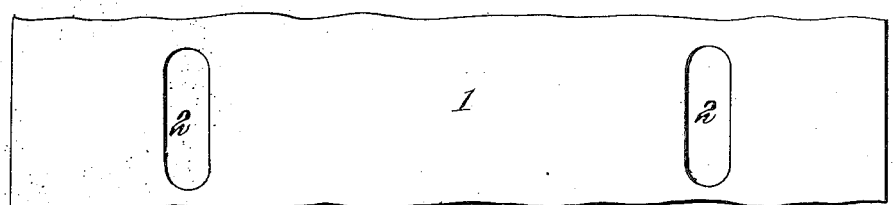
Fig. 4 is a fragmentary view of the rim, showing the slots through which the ends of the cleats are inserted.
Figure 5:
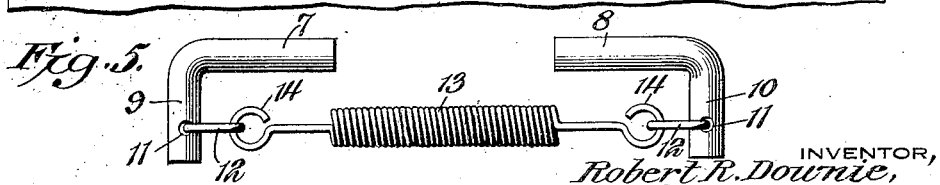
Fig. 5 is a side elevation of the independent locking means for each cleat.

It will be seen, from Fig. 3, that to remove the detachable locking means, it is only necessary to force one of the locking members, as 8, out of engagement with the link 6, as shown in dotted lines. After the locking member 8 has been removed, it is an easy matter to remove the locking member 7, since the tension of the spring is no longer active.

In applying the cleat 3, it is only necessary to lay the links on the rim in such a manner that the two end links 5 and 6 may be disposed neatly within the slots 2. The locking member 7 is first introduced through the end of the link which extends beyond the inside of the rim. Spring 13, as is shown in Fig. 3, is then expanded until the inner end of the locking member 8 passes beyond the outside edge of the link 6 and is disposed in alinement with the opening in the link 6. By then releasing the locking member 8, the spring 13 will be retracted and force the arm 10 of the member 8 into abutting relation with the link 6, and the arm 9 of the member 7 into a similar relation with the link 5.

The efficiency of a chain as a cleat is well known. It provides a flexible means for engaging the surface of the road, and by reason of its flexibility, it will avoid or glide off the hard or protuberating parts of the surface and embed itself in the intervening softer portions. As a consequence, maximum traction results because the cleats then pull against the firmly embedded hard portions of the roadbed. Also because of its flexibility, it tends to clean itself during the revolution of the wheel.

The fastening means, by reason of the simplicity of its design, will be constantly worked free of dirt and may be readily removed when necessary. The strains of tractioning fall upon the ends of the slots, and also upon the locking members 7, 8, causing them to be held more firmly against the inside of the rim. No severe strains are placed upon the spring, which merely serves to hold the locking members 7, 8 from working out of place.

Figs. 6 to 9, disclose a modification of not only the cleat, but also the detachable locking means illustrated in Figs. 1 to 5, inclusive.

The device illustrated in Figs. 6 to 9, inclusive, serves the same function as that illustrated in Figs. 1 to 5, but instead of the chain cleat 3, a flat bar cleat 15 is employed, with the inwardly extending perforated ends 16 and 17 inserted through the slots 2 of the rim 1, and engaged by the locking members 7 and 8, slidably mounted in the perforated ends 16 and 17, respectively. The slidable locking members 7 and 8 are provided with arms 9 and 10, which are at right angles to the slidable members 7 and 8, and are held in position by a spring 18 provided with a coil 19, which tends always to maintain the arms 9 and 10 of the members 7 and 8, respectively, in abutting relation with the extensions 16 and 17 of the cleat 15. The ends of the spring 18 are bent at right angles to the main body of the spring, and are provided with hooks 20 and 21, which are inserted through perforations 11 formed in the arms 9 and 10 of the members 7 and 8, respectively.

It will be seen that any required number of cleats may be supplied to the rim of the wheel, and since they are in all respects independent of each other, the injury of one does not affect the others.

In the forms illustrated, it will be particularly noted that the slots 2, which are formed in the rim of the wheel, and elongated circumferentially of the rim, are slightly larger than the ends of the cleats which are inserted through the slots, thereby permitting a certain amount of play between the parts, and causing dirt which may have become embedded in the slots and around the cleat, to be worked loose by the revolution of the wheel.

It will be further noticed that the ends of both cleats fall short of the full width of the rim, and engage the rim at points which are spaced or removed from the outer or side edges of the rim. This construction, therefore, prevents deformation of the edges of the rim, which would be liable to injury if the cleats were passed over and around the edges of the rim, because of the concentrated power or pressure exerted on the edges of the rim when the wheel rides over a cleat on hard ground.

The cleat device requires no tools to apply or remove the same, and no great accuracy in manufacture. A slight relative displacement of a pair of slots does not impair the efficiency of the cleat. The spring of the fastening device readily compensates for any errors in assembly.

As a further modification, a less practical construction could be provided by means of a pair of springs, permanently fixed at one end to the inside of the rim and detachably connected to each locking member, but this construction would necessitate the manipulation of each locking member to release the cleat.

What is claimed is:—

1. A traction wheel provided with a rim having slots spaced from the side edges of the rim, a cleat having its ends passed through the slots and projecting from the inside of the rim, and resilient means on the inside of the rim detachably engaging the projecting ends of the cleat.

2. A traction wheel provided with a rim having slots spaced from the side edges of the rim, a cleat having its ends passed through the slots and projecting from the inside of the rim, and spring-actuated locking members located on the inside of the rim for detachably engaging the projecting ends of the cleat.

3. A traction wheel provided with a rim having slots spaced from the side edges of the rim, a cleat having its ends passed through the slots and projecting from the inside of the rim, a pair of slidable locking members located on the inside of the rim and detachably engaging the projecting ends of the cleats, and resilient means to hold said members in locking position.

4. A traction wheel provided with a rim having slots spaced from the side edges of the rim, a chain cleat having the end links passed through the slots, and means on the inside of the rim for detachably engaging said end links.

5. A traction wheel provided with a rim having slots spaced from the side edges of the rim, a chain cleat mounted on the outer face of the rim and having its end links inserted through the said slots, and resilient means located on the inside of the rim for detachably locking the portions of the end links extended through said slots.

6. A traction wheel provided with a rim having slots spaced from the side edges of the rim, a chain cleat mounted on the rim and having its end links inserted through said slots, and spring-actuated locking members located on the inside of the rim for detachably locking the end links.

7. A traction wheel provided with a rim having a pair of slots spaced from the side edges of the rim, a chain cleat mounted on the outside of the rim and having its end links inserted through the slots, and a pair of slidable locking members located on the inside of the rim for detachably locking the end links to the inner portion of the rim.

8. A traction wheel provided with a rim having slots located between the side edges of the rim, a detachable cleat having its ends projected through the slots in the rim, angular slidable members adapted to be moved toward or from each other for securing the ends of the cleat to the inside of the rim, and means for maintaining said slidable members in locking position.

9. A traction wheel provided with a rim having a pair of spaced slots located between the side edges of the rim, a cleat having its ends projecting inwardly through the spaced slots, angular locking members slidably passed through the inwardly-projecting ends of the cleat, and resilient means for preventing displacement of said slidable locking members.

10. A traction wheel provided with a rim having spaced slots located between the side edges of the rim, a cleat having its ends also spaced from the side edges of the rim and projecting inwardly through the spaced slots, angular slidable members bearing against the inner portion of the rim and engaging the ends of the cleat to lock said cleat on the rim, and resilient means constantly urging the slidable means toward each other and in locking position with the ends of the cleat.

11. A traction wheel provided with a rim having spaced slots located between the side edges of the rim, a detachable cleat having its ends projecting through the spaced slots in the rim, locking members loosely and detachably mounted on the ends of the cleat on the inner side of the rim, and resilient means connecting the locking members for preventing displacement of the same from the ends of the cleat, said locking members being separately movable.

12. A traction wheel provided with a rim having spaced slots located between the side edges of the rim, said slots being elongated circumferentially of the rim, a detachable cleat having its ends projecting through the spaced slots in the rim, said ends being narrower than said slots to allow them to work loosely therein, and locking means engaging the ends of the cleat and mounted on the inside of the rim.

In testimony, that I claim the foregoing as my own I have hereunto affixed my signature.

ROBERT REX DOWNIE.